United States Patent Office 3,660,513
Patented May 2, 1972

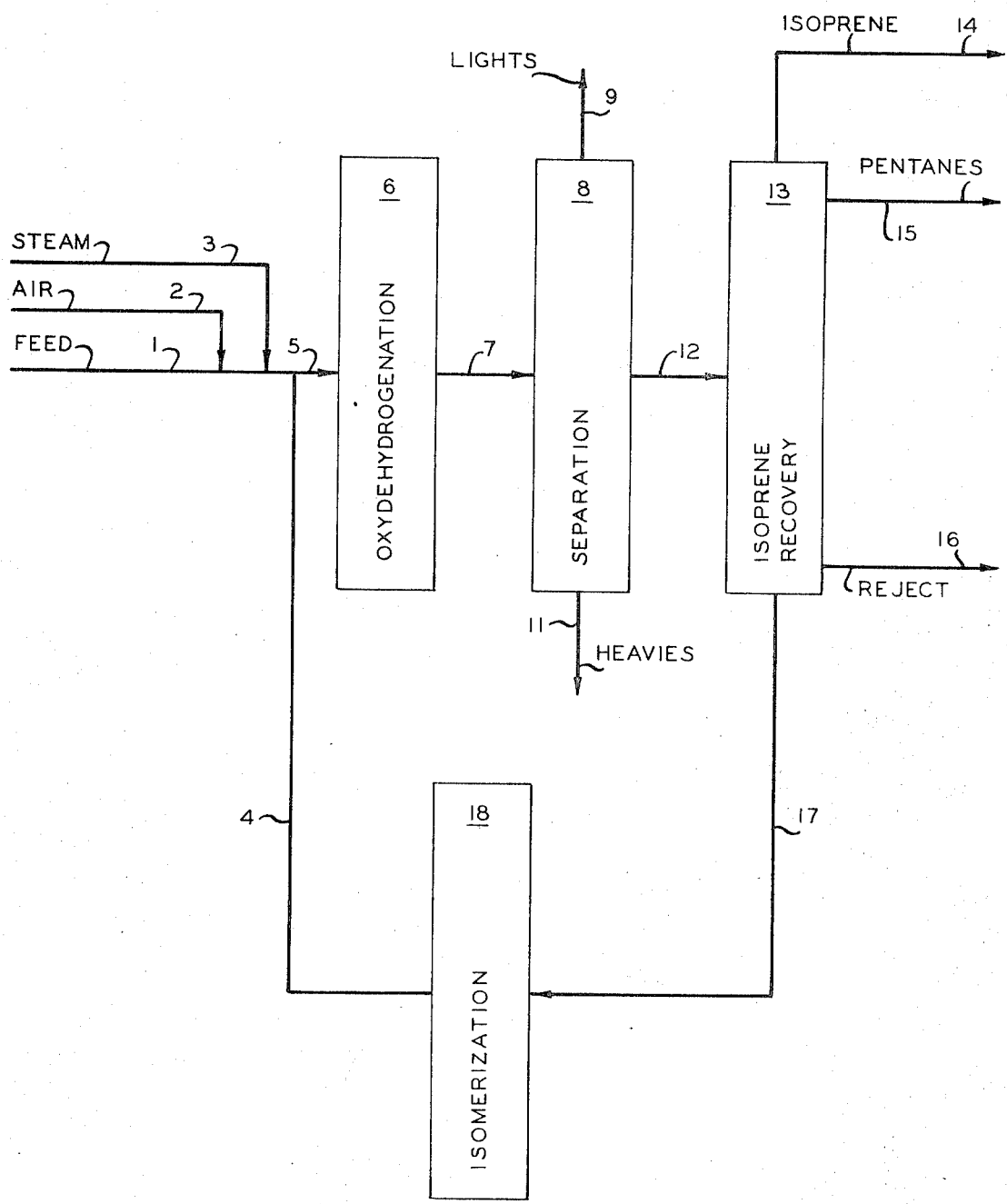

---

3,660,513
ISOPRENE FROM MIXTURE OF $C_5$-PARAFFINS AND OLEFINS BY ONE-STEP OXIDATIVE DEHYDROGENATION WITH ISOMERIZATION OF RECYCLE n-AMYLENES
Joseph W. Davison, Bartlesville, Okla., assignor to Phillips Petroleum Company
Filed Jan. 8, 1970, Ser. No. 1,433
Int. Cl. C07c 5/18
U.S. Cl. 260—680 E        12 Claims

ABSTRACT OF THE DISCLOSURE

Isoprene is prepared from a stream composed of mixed $C_5$ aliphatics, including both normal and branched, saturated and unsaturated, components, by selectively oxidatively dehydrogenating only the isoolefins within the mixed $C_5$ stream. The isoprene produced is recovered, while the remainder of the stream is separated into pentanes and n-amylenes, the latter being skeletally isomerized and recycled to selective dehydrogenation.

---

My invention relates to the production of isoprene from a stream of mixed $C_5$ aliphatics. In another aspect, the invention pertains to the selective conversion of isoamylenes to isoprene in the presence of mixed saturated and unsaturated $C_5$ aliphatics.

Isoprene is the molecular unit of natural rubber, and the basic unit for synthetic natural rubber. As a consequence, isoprene is a valuable monomer for the production of rubber, as well as for other polymers and copolymers. Even greater use can be made of polyisoprene if the cost of the basic building block, the isoprene, can be reduced. Refinery-produced mixed $C_5$ cuts of broad and varying composition represent potential sources of low cost isoprene.

I have discovered a method of producing isoprene from a mixed $C_5$ cut or refinery stream, without the necessity of first separating the isoolefins or isoamylenes from the other $C_5$'s present. Thus, several of the unsaturated $C_5$ aliphatics present in the broad $C_5$ cut are converted to isoprene by selective oxidative dehydrogenation, without interference from other $C_5$ saturated or unsturated components present. Consequently, ultimate separation of the isoprene is more easily and effectively accomplished. My process avoids initial preliminary separation of the isoamylenes into a high purity stream as necessitated by previous methods, which is very expensive and time-consuming.

It is the object of my invention to provide more economically produced isoprene. A further object of my invention is to selectively produce isoprene from a mixture of $C_5$ aliphatics.

Other aspects, objects, and the several advantages of my invention will be apparent to one skilled in the art from the following description and from the appended claims and flow-sheet.

The broad based mixed $C_5$ aliphatics stream is first subjected to oxidative dehydrogenation so as to convert, at least in part, the isoolefinic components contained in the stream to isoprene. The gist of my invention lies in the discovery that by an oxidative dehydrogenation process employing an iron-phosphorus-oxygen catalyst, the isoamylenes can be selectively dehydrogenated to isoprene while in the presence of a conglomeration of other $C_5$ saturates and n-amylenes. I have incorporated this discovery into my process to produce isoprene from all $C_5$ components contained in the mixed $C_5$ aliphatics stream other than from the saturated components. Any isoamylenes remaining unconverted simply pass through the separation and purification steps of my process and are cycled as a part of the stream to skeletal isomerization wherein they pass unchanged and form a further part of the isoamylenes feed to the oxidative dehydrogenation step.

My invention is applicable to any refinery stream containing, in a broad sense, $C_5$'s. A variety of such refinery streams are available, such as from a crude still; from fractionation of refinery products such as a thermal cracking unit, a fluid catalytic cracker, from naphtha cracking, and the like; from olefin disproportionation reactions; and from other refinery and petrochemical operations. The relative composition as to particular $C_5$ aliphatics contained in any such stream often is variable. The $C_5$ aliphatics of saturated and monolefinic type can include the following:

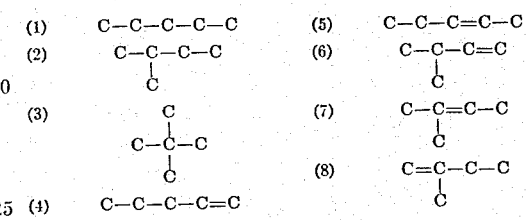

all shown skeletally, for simplicity, without including the necessary hydrogen atoms attached to the carbons in appropriate locations. The end-product desired is isoprene, i.e., 3-methyl-1,3-butdiene:

(9)          C=C—C=C
               |
               C

Of the $C_5$ saturated and monolefinic aliphatics possible in the mixed $C_5$ aliphatic stream as shown by the skeletal Formulas 1 through 8 preceding, the isoamylenes 6, 7, and 8 each are converted upon dehydrogenation to isoprene, being the only ones within the $C_5$ aliphatics stream to be dehydrogenated under the conditions and with the catalysts according to my process.

After the selective conversion of the appropriate components to isoprene by oxidative dehydrogenation, the resulting products stream is separated into an isoprene stream, a stream of the saturates or pentanes 1, 2, and 3, and a stream of the straight chain n-amylenes 4 and 5 plus any unconverted isoamylenes. The latter group is further utilized by being subjected to skeletal isomerization to form additional isoamylenes 6, 7, and 8, for recycle to dehydrogenation for production of additional isoprene. Thus, effectively, out of the broad $C_5$ mixture, my process produces isoprene from all except the saturated pentane components.

My drawing attached presents in flow-sheet fashion the relationship of the several steps of my process. Enter-unsaturated $C_5$ isomers as described hereinabove. Air or other oxygen-containing gas 2 and steam 3 are added. Additional isoamylenes 4 from skeletal isomerization 17 hereinafter described are added and the whole mixture 5 then fed to an oxidative dehydrogenation zone 6. In the oxidative dehydrogenation zone 6, the isoamylene components of the entering stream 5 are converted at least in part to isoprene.

The effluent stream 7 from the oxidative dehydrogenation zone 6 is conducted to a separation zone 8 where light materials are rejected as overhead 9 containing primarily nitrogen, oxygen, carbon monoxide and dioxide, and $C_4$ and lower. Heavies 11 also are rejected, primarily $C_6$ and heavier hydrocarbons, as well as the considerable amounts of water produced in the oxidative dehydrogenation reaction. The remaining stream 12 from separation step 8 is sent to an isoprene recovery zone 13 and separated into 4 primary streams: the important isoprene stream 14 which is my desired product; a stream of saturates 15, the n- and isopentanes which can be utilized elsewhere in the refinery; a minor amount of rejects stream 16 including cyclopentadienes and piperylenes formed in the dehydrogenation step; and the important n-amylenes recycle stream 17 which also will contain or be combined with any unconverted isoamylenes.

The n-amylenes stream 17 is conducted to a skeletal isomerization zone 18 and converted at least in part to additional isoamylenes. The effluent 4 from skeletal isomerization 18 then is cycled to the oxidative dehydrogenation step 6, usually as part of the feed mixture 5 thereto, to form additional isoprene. Any n-amylenes unconverted in skeletal isomerization zone 18 pass through the dehydrogenation zone and are again separated for skeletal isomerization.

From the above description and having followed the flow of the process with the flow sheet, the usefulness and effectiveness of the process can be even more fully realized from a study of the following material balance which starts with a $C_5$ stream taken from a catalytic cracker. Stream numbers shown on the material balance correspond with stream numbers shown on the flow sheet and as given in the description of the flow sheet hereinabove.

The material balance shows the progress of a refinery derived stream, a $C_5$ aliphatics cut from a catalytic cracker, through the several steps of my process. The isoolefinic content and the n-olefinic content of the broadly based $C_5$ refinery stream are all converted to isoprene, thus making or producing isoprene from all but the pentanes. All this is accomplished without the usual and relatively expensive separation steps heretofore necessary to separate the isoamylenes out of mixed $C_5$'s, or at least to separate the amylenes from saturated skeletal isomers and then follow with various conversion processes for production of isoprene. My process is highly effective in producing effective quantities of valuable isoprene from the original relatively low value feed stream of a refinery mixed-$C_5$ cut.

The process of oxidative dehydrogenation converts a portion, though not necessarily all, of the isoamylenes to isoprene. Conversion need not be quantitative, and more usually will approach a lower value, such as 80 percent. n-Amylenes are separated, along with isoamylenes remaining unconverted, and subjected to skeletal isomerization. n-Amylenes are isomerized to isoamylenes, while isoamylenes already present are not affected. Again, isomerization need not be complete at all. The effluent from skeletal isomerization is returned to the oxidative dehydrogenation step. Thus, as the material balance reflects, isoprene is produced in effective amounts from all olefinic components of the $C_5$ aliphatic cut.

A catalyst particularly suitable for the necessary selective oxidative dehydrogenation of isoamylenes within the midst of other $C_5$ components is an iron-phosphorus-oxygen catalyst system prepared to have an excess phosphorus content of from 0.01 to 2 times, preferably 1.05 to 1.5 times, the stoichiometric amount required for the phosphorus to react in the form of phosphate ions $PO_4^{\equiv}$ with all the iron in the catalyst. Such catalysts are highly active catalysts for the particular process involved in my invention. The iron within the catalyst composition can be ferric, ferrous, or a mixture of ferro and ferri forms.

The catalysts can be prepared in a number of ways, preferably by the treatment of iron oxides or other iron salts, such as iron hydroxides and phosphates, with phosphoric acid; or by admixing iron salts in the dry form with phosphorus pentoxide; and the like. Additional methods can utilize a precipitation of iron phosphates such that the finished product contains the necessary phosphorus over and above the stoichiometric amount. For example, a polyphosphate melt can be formed by heating an ammonium or alkali metal mono- or dihydro-

STREAM NUMBER, QUANTITIES IN MOLES/HR.

| Component | (1) $C_5$ stream from catalytic cracker | (2) Air to dehydrogenation reactor | (3) Steam to dehydrogenation reactor | (4) Recycle isoamylenes from isomerization | (5) Total feed to dehydrogenation reactor | (7) Dehydrogenation reactor effluent | (9) Lights reject | (11) Heavies reject | (14) Isoprene product | (15) Paraffins reject | (16) Reject cyclopentadiene and piperylenes | (17) Feed to isomerization |
|---|---|---|---|---|---|---|---|---|---|---|---|---|
| Nitrogen | | 3,780.0 | | | 3,780.0 | 3,780.0 | 3,780.0 | | | | | |
| Carbon Monoxide | | | | | | 95.6 | 95.6 | | | | | |
| Oxygen | | 1,004.0 | | | 1,004.0 | 531.0 | 531.0 | | | | | |
| Acetylenes | | | | | | 12.6 | 12.6 | | | | | |
| Carbon Dioxide | | 1.4 | | | 1.4 | 97.0 | 97.0 | | | | | |
| Propylene | | | | 3.0 | 3.0 | 2.7 | 2.7 | | | | | |
| Isobutylene | 0.05 | | | 2.3 | 2.3 | 2.1 | 2.1 | | | | | |
| Butadiene | | | | | | 1.1 | 1.1 | | | | | |
| Trans-butene-2 | | | | | | 9.6 | 9.6 | | | | | |
| Cis-butene-2 | 5.0 | | | 6.0 | 11.0 | | | 0.06 | | | | |
| 3-methylbutene-1 | 1.1 | | | 12.6 | 13.7 | 10.4 | 0.3 | | | | | 0.2 |
| 1,4-pentadiene | | | | | | 1.5 | | | | | | 0.2 |
| Isopentane | 251.0 | | | 303.0 | 554.0 | 554.0 | 2.7 | 0.01 | | 255.0 | | 297.0 |
| Pentene-1 | 39.6 | | | 18.4 | 58.0 | 67.9 | 0.2 | 0.1 | | 0.5 | | 67.3 |
| 2-methylbutene-1 | 101.0 | | | 99.9 | 201.0 | 62.9 | 0.02 | 0.2 | | 0.4 | | 62.5 |
| Isoprene | | | | | | 419.0 | 0.1 | 0.2 | 4.08 | | | 0.6 |
| n-Pentane | 38.9 | | | 47.0 | 85.9 | 85.9 | | 0.1 | | 39.8 | 10.1 | 46.1 |
| Trans-pentene-2 | 125.0 | | | 60.9 | 186.0 | 136.0 | | 0.05 | 1.1 | 0.9 | | 133.0 |
| Cis-pentene-2 | 71.2 | | | 62.3 | 134.0 | 136.0 | | 0.2 | 1.6 | 0.9 | | 133.0 |
| 2-Methylbutene-2 | 219.0 | | | 150.0 | 369.0 | 55.0 | | 0.1 | 1.3 | 0.4 | | 53.2 |
| Trans-piperylene | | | | | | 22.9 | | 0.3 | 40 ppm | | 22.5 | 0.03 |
| Cyclopentadiene | | | | | | 2.3 | | 0.03 | 1 ppm | | 2.3 | |
| Cis-piperylene | | | | | | 10.7 | | 0.2 | | | 10.6 | |
| $C_6^+$ | 3.9 | | | 24.4 | 28.3 | 27.1 | | 24.8 | 0 | | 1.9 | 0.01 |
| Water | | | 22,300 | | 22,300.0 | 22,960.0 | | 22,960.0 | | | | | gen orthophosphate to a temperature in the range of from about 200 to 1000° C., and then adding a ferric or ferrous or combination iron salt to the resulting mass.

The catalysts can be used in the process in the form of granules, mechanically formed pellets, or other conventional forms depending upon the particular type of reactor involved and conditions to be employed. Catalysts employed can be utilized further with a suitable support or diluent material such as silica, alumina, boria, magnesia, titania, zirconia, and physical and chemical combinations thereof, such as silica with alumina, silica-alumina, and the like.

Operating conditions for oxidative dehydrogenation can vary widely. Typical conditions include a temperature in the range of from about 700 to 1300° F., preferably from 800 to 1200° F.; a pressure in the range of from about 0.1 to 250 p.s.i.a., preferably from 0.5 to 25 p.s.i.a.; an oxygen:gaseous $C_5$ feed volume ratio in the range of from about 0.1:1 to 3:1, preferably from 0.5:1 to 2:1; and a steam:$C_5$ feed volume ratio in the range of from about 0.1:1 to 100:1, preferably 5:1 to 20:1. The $C_5$ feed space rate can be from about 50 to 5000, preferably from 100 to 2500, volumes of feed vapor per volume of catalyst per hour.

The process itself is ordinarily carried out by forming a mixture preferably preheated, of the $C_5$ feed, steam, and an oxygen-containing gas, and then passing this admixture over the catalyst at the desired temperature and pressure relationships. The oxygen-containing gas can contain inert diluents such as nitrogen and the like as in air, or even can be flue gases containing residual oxygen. Pure or substantially pure oxygen is suitable.

When necessary, the catalyst can be reactivated by adding a phosphorus compound, such as phosphoric acid, $P_2O_5$, and the like, including phosphenes and organophosphorus compounds. One method of reactivation is to feed, continuously or intermittantly, with the entering admixture to the reaction zone, a small amount of a phosphorus compound. Such addition should be in the amount necessary to maintain catalytic activity, and usually will be in the range of from about 0.01 up to as much as 0.50 volume of phosphorus compound per volume of catalyst per hour.

Alternatively, the entering $C_5$ feed to the system can be stopped, the steam and/or oxygen-containing gas can be continued if desired, one or the other or both, so as to carry the necessary amount of phosphorus-containing compound into the catalyst bed. Of course, the phosphorus compound can be added directly to the catalyst bed, but this is usually awkward with poorer distribution.

The phosphorus-containing compound is added by any method such that the original phosphorus content of the catalyst is substantially regained, maintained or even augmented. Phosphorus loss from the catalyst in processing appears in the steam condensate from the reactor, and is easily checked so that the amount of phosphorus calculated to be lost from time to time can be re-added in any of the manners described.

The stream from oxidative dehydrogenation contains some light materials, usually plus large amounts of diluent gas where such as air is used as the oxygen-containing gas, and of course large quantities of water formed in the dehydrogenation reaction and from the use of steam. Steam usually is condensed in an effluent condenser, and recycled to a steam-forming drum. The hydrocarbon stream is separated from its water content in a vapor separator. The stream can be contacted in a wash tower, if desired, with an alkaline material such as boiler blowdown water and caustic to remove traces of acids and aldehydes.

Nitrogen, oxygen, and other lights are separated in a conventional mineral seal oil absorber. This absorber absorbs the hydrocarbons and rejects lights as an overhead. The lights removed as overhead can be sent to the plant flare or otherwise as desired. The absorber can operate, for example, such as at 20 p.s.i.a., with a top temperature of about 100° F., and a bottom temperature of about 263° F. The absorbed hydrocarbons are recovered from the rich oil in the stripper, fractionated for removal of undesirably heavy components, and sent to extractive distillation utilizing a selective solvent.

The $C_5$ stream from the oxidative dehydrogenation unit contains saturates, olefins, and the desired isoprene as primary diolefin with traces of other diolefins. By means of liquid extraction the diolefin content is increased to around 50 weight percent, and then further increased to 99 weight percent by extractive distillation in the extractor stripper unit. Suitable solvents include sulfolane, furfural, methylcarbitol, ethylcarbitol, acetonitrile, ethylenediamine, alkylenecarbonates, lactones, ethylene glycol, diethylene glycol, and the like. The selective solvent is normally introduced into the top of the extractor distillation column. Typically, extractive distillation is operated with a top temperature of from about 100 to 150° F., and a bottom temperature of from about 175 to 325° F. A particularly useful method of extractive distillation is disclosed in United States Letters Patent 3,583,966 issued June 8, 1971 to Joseph W. Davison. Recovery of diolefins is high with negligible amounts of diolefins remaining in the recycle olefin-paraffin raffinate so as not to adversely affect the olefin isomerization operation.

Condensed isoprene concentrate from the extractor-stripper side draw is fed to a pentadiene column. This column fractionates 1–4 pentadiene as overhead. The bottoms product is an isoprene concentrate which is pumped into an extractive fractionator. Solvent is added and modifies relative volatility so that cyclopentadiene and piperylenes are absorbed in the solvent and removed as bottoms product. The solvent stream is stripped of cyclopentadiene and piperylenes which are rejected. High purity isoprene is the overhead product of the extractive fractionator and is recovered as the product of my process.

The stream of n-amylenes together with any unreacted isoamylenes, separated from the purification of isoprene, is sent to skeletal isomerization to convert the n-amylenes at least in part to isoamylenes which can be recycled through oxidative dehydrogenation for production of additional isoprene. Various methods of skeletal isomerization can be used. For example, conversion of n-amylenes to isoamylenes substantially without polymerization or other destructive reactions can be accomplished by contacting the n-amylenes-containing stream at elevated temperatures with a solid catalyst.

One suitable skeletal isomerization process is described in United States Letters Patent 2,395,274 to Hillyer and Drennan. In this process, n-olefins, either alone or with a substantially inert diluent material such as saturated hydrocarbons, steam, and the like, are contacted with a catalyst at temperatures of from about 500 to 1300° F. The catalyst, comprising bauxite preferably, previously has been activated by calcining at elevated temperatures. Space velocities of from about 100 to 1500 volumes per volume of catalyst space per hour, and atmospheric to slightly superatmospheric pressures, are normally used to produce high yields of the isoproduct. Pressures of from about 15 or somewhat below upward to about 100 p.s.i.g. are utilized, rather than higher pressures, to avoid appreciable polymer formation.

Another method of skeletal isomerization of the n-amylenes in the stream to the skeletal isomerization unit employs an alumina-based catalyst which has been activated at temperatures of from about 1100 to 1400° F. Such alumina-based catalysts include $\eta$-alumina, $\gamma$-alumina, modified alumina such as alumina-boria, and the various halogen compound-treated aluminas. Other skeletal isomerization catalysts can be used, such as zeolites or molecular sieves, and the activated clays. After suitable activation, the activated alumina catalyst is utilized to isomerize the n-pentenes at contacting temperatures in the range of from about 400 to 1000° F., preferably 600 to 900° F. Similar pressures are utilized for these catalysts as described for the bauxite catalyst. The olefin feed to the reaction zone usually will have a liquid hourly space velocity measured at 60° F. of from about 0.01 to 30 volumes of liquid per volume of catalyst per hour, preferably 1 to 20.

In the foregoing discussions I have disclosed my process, described it fully with relation to the flow-sheet drawing accompanying this specification, have shown stream compositions for various steps in my process, have shown specifically how each step can be practiced without obscuring the process of my invention by unnecessary details familiar to those skilled in the art to which it most nearly pertains, and have shown the efficiency and effectiveness of my process. Reasonable variations and modifications are possible within the scope of my disclosure without departing from the scope and spirit thereof.

I claim:

1. A process for the preparation of isoprene from a mixed $C_5$ aliphatics stream comprising normal and isopentanes and normal and isoamylenes, which process comprises the steps of:
    (a) selectively dehydrogenating at least a portion of said isoamylenes contained in said mixed $C_5$ aliphatic stream and leaving said normal and isopentanes and normal amylenes not converted, under oxidative dehydrogenation conditions employing iron-phosphorus-oxygen catalyst, wherein in said iron-phosphorus-oxygen catalyst the phosphorus content thereof is from about 1.01 to about 2 times the stoichiometric amount of phosphorus required to react with the iron in the form of $PO_4^{\equiv}$,
    (b) separating the products from said step (a) into isoprene, saturated pentanes, and normal amylenes plus any unreacted isoamylenes,
    (c) skeletally isomerizing at least a portion of said n-amylenes present with said unreacted isoamylenes to additional isoamylenes,
    (d) charging the products of said step (c) to said step (a) as a further portion of said stream, and
    (e) recovering said isoprene as a product.

2. The process of claim 1 wherein said mixed $C_5$ aliphatics stream is derived from thermal distillation of crude oil.

3. The process of claim 1 wherein said mixed $C_5$ aliphatic stream is derived from fluid catalytic cracking.

4. The process of claim 1 wherein said mixed $C_5$ aliphatic stream is derived from thermal cracking.

5. The process of claim 1 wherein said mixed $C_5$ aliphatic stream is derived from naphtha cracking.

6. The process of claim 1 wherein said mixed $C_5$ aliphatic stream is derived from olefin disproportionation.

7. A process according to claim 1 wherein said iron is in the form of ferric, ferrous, or ferri-ferro, and wherein further is added to the oxidative dehydrogenation reaction zone at least one phosphorus-containing compound.

8. A process according to claim 7 wherein is added from about 0.01 to about 0.5 volume of said phosphorus-containing compound per volume of said iron-phosphorus-oxygen catalyst per hour.

9. The process of claim 8 wherein said oxidative dehydrogenation conditions include a temperature of from about 700 to about 1300° F., a pressure of from about 0.1 to about 250 p.s.i.a., an oxygen-gaseous hydrocarbon feed volume ratio of from about 0.5:1 to about 2:1, and a steam:gaseous hydrocarbon feed space rate of from about 50 to about 5000 volumes of feed vapor per volume of said catalyst per hour.

10. The process according to claim 9 wherein in said step (c) skeletal isomerization conditions include an isomerization catalyst selected from aluminas, molecular sieves, and activated clays, a temperature of from about 400 to about 1000° F., a pressure from about 15 to about 100 p.s.i.g., and an n-olefin feed of from about 0.01 to about 30 volumes of liquid feed per volume of catalyst per hour.

11. The process according to claim 9 wherein in said step (c) skeletal isomerization conditions include a bauxite catalyst, a temperature of from about 500 to about 1300° F., a pressure of from about 10 to about 100 p.s.i.g., and an n-olefin feed rate of from about 100 to about 1500 volumes of olefin per volume of catalyst per hour.

12. A process according to claim 9 wherein said products of said step (a) further include minor amounts of at least one isoprene polymerization catalyst poison selected from $C_4$ acetylenes, $C_5$ acetylenes, piperylenes, cyclopentadienes, the mixtures of at least two thereof, and wherein said catalyst poisons are substantially removed from said products of said step (a) prior to said step (b).

References Cited

UNITED STATES PATENTS

| 3,110,746 | 11/1963 | Voge et al. | 260—680 |
| 2,900,429 | 8/1959 | Heinemann et al. | 260—680 |
| 2,422,884 | 6/1947 | Burgin | 260—683.2 |
| 2,471,647 | 5/1949 | Oblad et al. | 260—683.2 |
| 3,284,535 | 11/1966 | Edwards et al. | 260—683.2 |

PAUL M. COUGHLAN, JR., Primary Examiner

U.S. Cl. X.R.

260—683.2

UNITED STATES PATENT OFFICE

CERTIFICATE OF CORRECTION

Patent No. 3,660,513    Joseph W. Davison    Dated: May 2, 1972

It is certified that error appears in the above-identified patent and that said Letters Patent are hereby corrected as shown below:

IN THE SPECIFICATION

Column 4, line 18, in the Table entitled "Stream Number, Quantities In Moles/Hr.", under column "(14)", entitled "Isoprene Product", the first number appearing "4.08" should read --- 408.0 ---.

IN THE CLAIMS

Claim 12, Column 8, line 35, after "pentadienes" and before "mixtures", "the" should read --- and ---.

Signed and sealed this 28th day of November 1972.

(SEAL)
Attest:

EDWARD M. FLETCHER, JR.
Attesting Officer

ROBERT GOTTSCHALK
Commissioner of Patents